Patented Oct. 10, 1922.

1,431,789

UNITED STATES PATENT OFFICE.

SAMUEL H. HAMILTON, OF PHILADELPHIA, PENNSYLVANIA.

FIRE-EXTINGUISHING LIQUID AND METHOD OF USING SAME.

No Drawing. Application filed September 1, 1921. Serial No. 497,710.

*To all whom it may concern:*

Be it known that I, SAMUEL H. HAMILTON, a citizen of the United States, residing in Philadelphia, Pennsylvania, have invented a Fire-Extinguishing Liquid and Method of Using Same, of which the following is a specification.

One object of my invention is to provide a liquid or liquids, with or without inert gas, which shall be particularly adapted for extinguishing fires as well as for retarding or preventing the subsequent ignition and combustion of the liquid or solid which had been previously burning, and the invention especially contemplates the provision of a liquid which when delivered to a burning substance, shall result in the formation thereon of a non-combustible film, serving to maintain a cooling inert gas blanket or curtain which shall reduce the temperature below the kindling point and by means of a non-combustible film shall prevent the access of oxygen.

I further desire to provide a novel method of applying to a burning substance a fire extinguishing liquid possessing the above noted characteristics.

In carrying out my invention I utilize commercial silicate of soda or water glass and incorporate with this a froth-producing material such as soap, the glucoside saponin commonly used in carbonated beverages, or any other froth-producing material. This emulsion or colloid solution is retained in any suitable receptacle until wanted for use, with or without an alkaline salt, such as ammonium carbonate. The latter serves to prevent possible fermentation or hydrolization of the glucoside or froth-producing material, although it may be omitted in some cases without departing from my invention. Obviously the solutions of water glass and glucoside may be retained in separate compartments or vessels in juxtaposition.

In utilizing the above liquid I deliver it to a fire to be extinguished and cause it to impinge upon, bubble through and cover the burning substance, preferably by means of an inert gas, such as nitrogen, under pressure. I may however, in some cases employ carbon dioxide gas under pressure, although this would be objectionable under certain conditions. When thus delivered by compressed gas upon a burning substance, the above described liquid is deposited thereon in the form of a froth or in the shape of bubbles, which including sodium silicate, at once react with the carbon dioxide produced by the burning substance to form films of meta-silicic acid, which is non-combustible and effectually prevents the oxygen reaching the burning material. Moreover it permits or causes the temperature of the latter to be quickly reduced below the kindling point, so that it serves to quickly and effectually extinguish the fire as well as to render difficult, and in some cases completely prevent, re-ignition of the said substances.

The compressed nitrogen or other inert gas used as a propellant for the above liquid not only acts to itself retard and smother the fire but is obviously of such a nature that it will not re-act either with the oxygen of the air or with the burning material to form combustible or injurious substances.

Under certain conditions I may use carbon dioxide for delivering my fire extinguishing liquid, without departing from my invention, since it would react with the silicate of soda as above described to form a non-combustible coating or film upon the burning material and upon the objects adjacent thereto. Ordinarily however, the burning material itself will supply sufficient carbon dioxide to produce the above reaction when the silicate of soda is delivered in the form of a froth or finely divided spray.

It is to be noted that the sodium silicate and frothing material constituting my fire extinguishing liquid are of such a nature as to be capable of delivery either directly upon a burning liquid, such as oil for example, or to be supplied through its body or mass to its surface, so that it lends itself particularly to the extinguishing of burning bodies of oil or similar combustible liquid when it would not be possible to deliver it directly upon the surface thereof.

Moreover the inert gas under pressure used as above described absorbs heat while expanding in the form of bubbles and exerts a cooling action on the liquid through which it passes, thus effectually reducing the kindling temperature of a mass of liquid in a tank for example, whose surface layer is burning. At the same time the curtain or blanket of incombustible bubbles or froth also cools the burning liquid and at the same time prevents access of oxygen thereto, thus quickly and effectually smothering and putting out the fire.

It is especially to be noted that by my invention I am enabled to cause a mass of relatively heavy liquid to pass through and remain in the form of a noncombustible blanket upon the surface of a relatively lighter liquid such as oil or gasoline and thus act to extinguish a burning tank of such liquid.

While I preferably employ sodium silicate in carrying out my invention as above described, it is to be understood that without departing from my invention I may use other soluble silicates such for example as silicate of potassium.

I claim:

1. A fire extinguishing liquid comprising essentially a soluble silicate and a froth-producing material.

2. A fire extinguishing liquid comprising essentially a soluble silicate and a glucoside.

3. A fire extinguishing liquid consisting of a soluble silicate, a froth-producing material, and an alkaline salt.

4. A fire extinguishing liquid consisting of a soluble silicate, a froth-producing material, and ammonium carbonate.

5. A fire extinguishing liquid consisting essentially of a substance capable of reacting with carbon dioxide to form a non-combustible film and a froth-producing material.

6. The method of extinguishing fires which consists in delivering thereto a frothing liquid containing a soluble silicate.

7. The method of extinguishing fires which consists in delivering thereto a frothing liquid containing a soluble silicate and an inert gas.

8. The method of extinguishing fires which consists in delivering thereto a mixture of sodium silicate solution, a froth-producing material, and an inert gas under pressure.

9. The method of extinguishing fires which consists in delivering thereto a mixture of a soluble silicate solution, a froth-producing material, and nitrogen under pressure.

10. The method of extinguishing fires which consists in delivering thereto a mixture of sodium silicate solution, a glucoside and an inert gas under pressure.

11. The method of extinguishing fires which consists in delivering thereto a mixture of sodium silicate, a froth-producing material and a non-combustible gas under pressure.

12. The method of extinguishing fires which consists in delivering thereto a liquid containing a soluble silicate and causing said liquid to assume the form of a film.

13. The method of extinguishing a burning liquid which consists in delivering through the same a body of gas under pressure sufficient to cool the liquid below the kindling point by reason of the expansion of said gas.

14. The method of extinguishing a burning liquid which consists in delivering thereto finely divided gas under such relatively high pressure as to cause said gas to expand in said liquid and cool the latter below its kindling point.

15. The method of extinguishing burning liquid which consists in passing through the same bubbles of silicate froth.

16. The method of extinguishing burning liquid which consists in forming a layer of non-combustible froth thereon by delivering through the same a frothing solution of a silicate and an inert gas.

17. The method of extinguishing burning liquid which consists in supplying a liquid containing a soluble silicate and frothing material below the surface of said liquid and causing said liquid to pass through the burning liquid by means of an inert gas under pressure to form a non-combustible foam on the surface of the burning liquid.

18. The method which consists in delivering an inert gas under pressure into a liquid containing a soluble silicate and a froth-producing material, and causing said gas and liquid to pass through the body of a burning liquid and form a non-combustible blanket on the surface thereof.

SAMUEL H. HAMILTON.